United States Patent
Kuwahara et al.

(10) Patent No.: US 7,587,174 B2
(45) Date of Patent: *Sep. 8, 2009

(54) ANTENNA UNIT AND RADIO BASE STATION THEREWITH

(75) Inventors: Mikio Kuwahara, Kokubunji (JP); Nobukazu Doi, Hachioji (JP); Toshiro Suzuki, Tama (JP); Yuji Ishida, Fujisawa (JP); Takashi Inoue, Irima (JP); Sumaru Niida, Irima (JP)

(73) Assignees: Hitachi, Ltd., Tokyo (JP); KDDI Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/716,541

(22) Filed: Mar. 9, 2007

(65) Prior Publication Data

US 2007/0293269 A1 Dec. 20, 2007

Related U.S. Application Data

(63) Continuation of application No. 10/674,455, filed on Sep. 29, 2003, now Pat. No. 7,203,462, which is a continuation of application No. 09/650,795, filed on Aug. 30, 2000, now Pat. No. 6,647,276.

(30) Foreign Application Priority Data

Sep. 14, 1999 (JP) ................................. 11-260407

(51) Int. Cl.
*H04B 7/00* (2006.01)
(52) U.S. Cl. .............. 455/67.16; 455/67.11; 455/226.1; 342/174; 342/442
(58) Field of Classification Search .............. 455/67.16, 455/67.11, 226.1; 342/174, 442
See application file for complete search history.

(56) References Cited

U.S. PATENT DOCUMENTS 5,122,808 A 6/1992 Kyriakos .................... 342/442

(Continued)

FOREIGN PATENT DOCUMENTS

EP 0762541 3/1997

(Continued)

OTHER PUBLICATIONS

European Search Report Application No. EP 00 12 0040 dated Mar. 28, 2003.

(Continued)

*Primary Examiner*—Joseph H Feild
*Assistant Examiner*—Huy D Nguyen
(74) *Attorney, Agent, or Firm*—Sofer & Haroun, LLP (57) ABSTRACT

A radio base station apparatus provided with an array antenna having a plurality of antenna elements for calibrating a phase difference among the array antenna elements. The base station has a probe signal adding unit which divides one probe signal and adds the divided probe signals to each receive signals received by the plurality of antenna elements. A probe data extracting unit extracts the probe data from the receive signals added with the probe signal. A phase calibration calculation unit calculates correlating phase calibration values required for calibrating a phase of each receive signal based on the probe data extracted by the probe signal extracting unit. A phase calibration unit calibrates a phase difference among the array antenna elements by calibrating the phase of the each receive signal based on the phase calibration from the phase calibration calculation unit.

7 Claims, 6 Drawing Sheets

U.S. PATENT DOCUMENTS

| | | | |
|---|---|---|---|
| 5,263,189 A | 11/1993 | Kultgen et al. | 455/276.1 |
| 5,469,172 A | 11/1995 | Schleder et al. | 342/174 |
| 5,546,090 A | 8/1996 | Roy, III et al. | 342/174 |
| 5,600,246 A | 2/1997 | Forgang et al. | 324/339 |
| 5,603,098 A | 2/1997 | Kwan | 455/83 |
| 5,604,929 A | 2/1997 | Loper et al. | 455/324 |
| 5,678,219 A | 10/1997 | Agarwal et al. | 455/280 |
| 5,729,237 A | 3/1998 | Webb | 343/700 |
| 5,793,800 A | 8/1998 | Jylha et al. | 455/126 |
| 6,058,318 A | 5/2000 | Kobayakawa et al. | 455/562 |
| 6,100,841 A | 8/2000 | Toth et al. | 342/149 |
| 6,181,297 B1 | 1/2001 | Leisten | 343/895 |
| 6,349,218 B1 | 2/2002 | Nakagawa et al. | 455/562 |
| 6,535,560 B1 | 3/2003 | Masenten | 375/261 |
| 6,647,276 B1 | 11/2003 | Kuwahara et al. | 455/562.1 |
| 7,203,462 B2 * | 4/2007 | Kuwahara et al. | 455/67.14 |
| 2005/0047384 A1 | 3/2005 | Wax et al. | 455/561 |

FOREIGN PATENT DOCUMENTS

| | | |
|---|---|---|
| EP | 0881704 | 12/1998 |
| EP | 0938204 | 8/1999 |
| JP | 11046180 | 2/1999 |
| WO | 9700543 | 1/1997 |
| WO | 9852248 | 11/1998 |
| WO | 9929049 | 6/1999 |

OTHER PUBLICATIONS

European Search Report Application No. EP 00 12 0040 dated Nov. 22, 2002.
Office Action w/ Translation.

* cited by examiner

ANTENNA UNIT AND RADIO BASE STATION THEREWITH

RELATED APPLICATIONS

This application is a continuation of U.S. patent application Ser. No. 10/674,455, filed on Sep. 29, 2003, now U.S. Pat. No. 7,203,462 which in turn is a continuation of U.S. application Ser. No. 09/650,795 filed Aug. 30, 2000 U.S. Pat. No. 6,647,276 issued on Nov. 11, 2003, the entirety of which are incorporated herein by reference.

BACKGROUND OF THE INVENTION

1. Field of the Invention

The present invention relates to an antenna unit and radio base station provided with that antenna unit.

2. Related Art Statement

Recently, demand for the cellular mobile phone of the CDMA (Code Division Multiple Access) system is increasing, and with that, techniques of coping with traffic increase are attracting attention. One is the technique of adaptive array antenna. In this technique, a radiation pattern of an antenna is controlled to follow each of multi paths through which a user signal arrives so as to moderate interference by signals of other users.

SUMMARY OF THE INVENTION

There exists a technique in which the control of the radiation pattern of an array antenna is carried out in the baseband.

However, a signal subjected to the array antenna controlling 20 in the baseband must passes through various circuits and cables before transmission from the antenna, and accordingly, when the signal arrives at each antenna, deviation due to distortion is generated between signals arriving at respective antennas. Thus when there is deviation between signals—arriving at respective antennas, it is impossible to transmit the signal with a desired radiation pattern.

Thus, a baseband processing circuit requires circuits for estimating level deviation and phase deviation generated in a radio frequency unit and cables and for compensating those deviations. Further, when cable length is large, it expands and contracts owing to variation in temperature, and accordingly, as a compensation circuit, use of an adaptive processing circuit is required.

In the present invention, a probe signal is applied to cables and a radio frequency unit, and an adaptive processing circuit uses this probe signal to perform the above-mentioned compensation.

DESCRIPTION OF THE PREFERRED EMBODIMENTS

Now, in the following, embodiments of a radio base station apparatus and an antenna unit used for that apparatus according to the present invention will be described in detail referring to the drawings.

Figure 1:
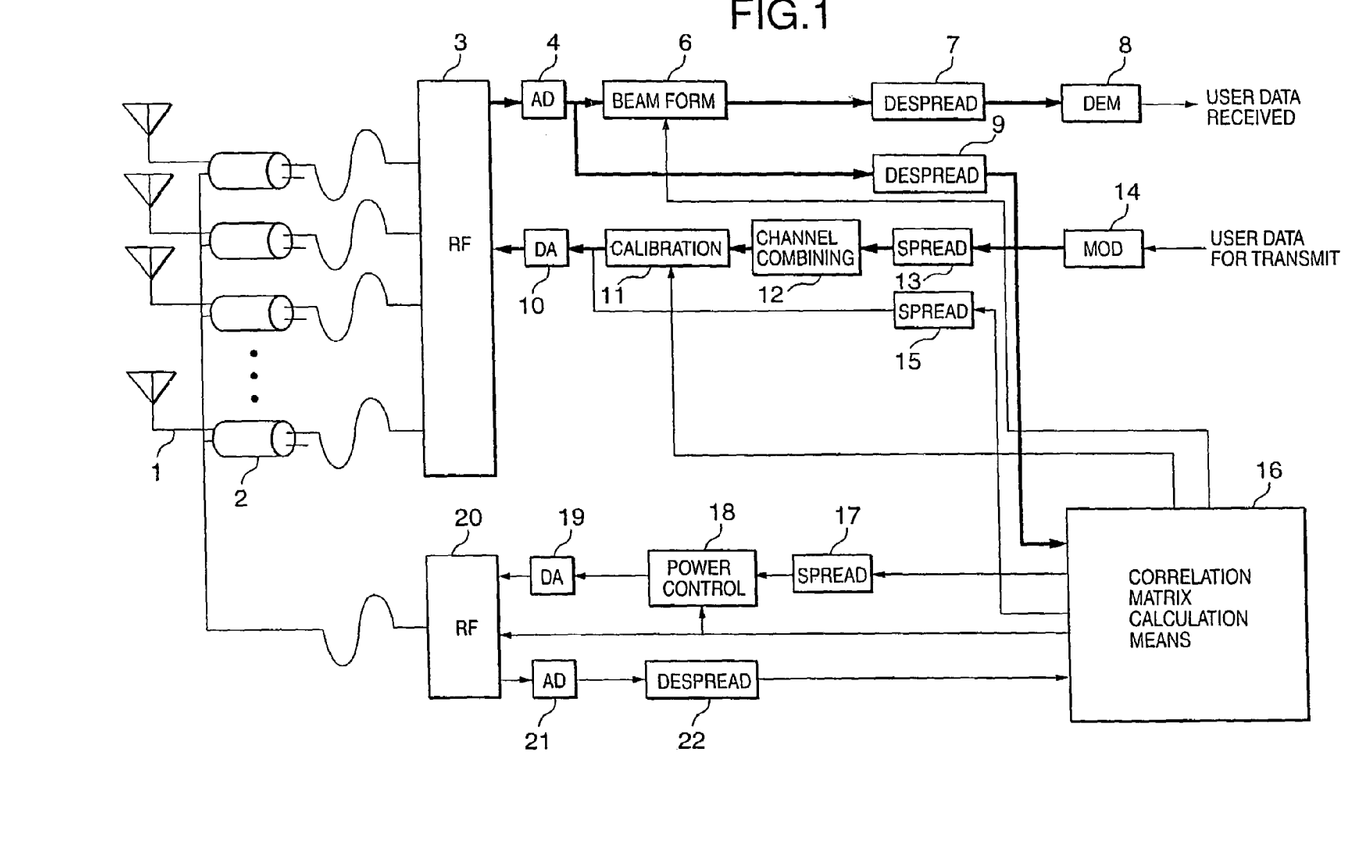
FIG. 1 is a diagram showing a configuration of a radio base station apparatus according to the present invention.
Figure 2:
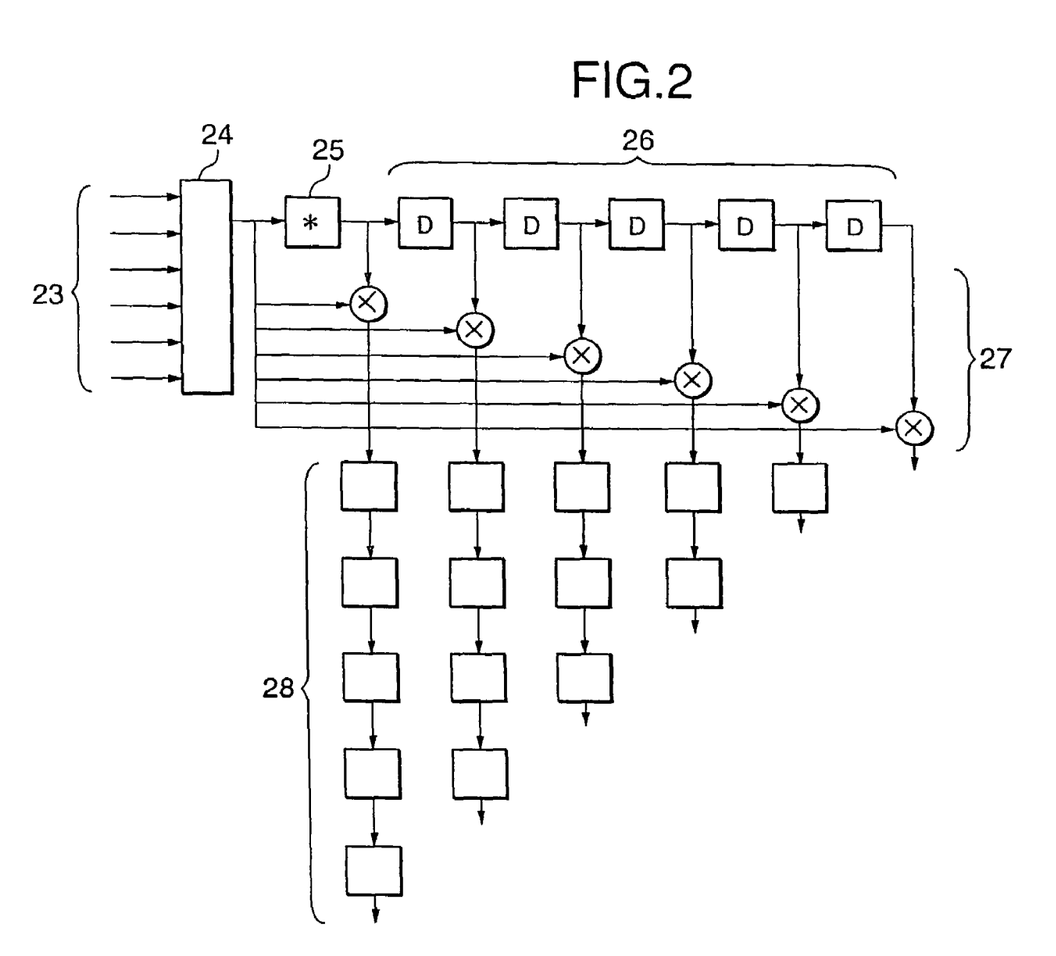
FIG. 2 is a diagram showing a configuration of a unit for calculation of correlation matrix.

FIG. 1 is a block diagram showing a configuration of a radio base station apparatus according to an embodiment of the present invention, and FIG. 2 is a block diagram showing a configuration of a unit for calculation of correlation matrix. In FIGS. 1 and 2, the reference numeral 1 refers to an antenna apparatus, 2 to a coupler, 3 and 20 to radio frequency units (RF units), 4 and 21 to A/D converters (ADC), 6 to a receive beam (Rx beam) form unit, 7 and 22 to despreaders, 8 to a space-time demodulator, 9 to a despreader for probe signal, 10 and 19 to D/A converters (DAC), 11 to a Transmit calibrater (Tx calibrater), 12 to a channel combiner, 13 to a spreader, 14 to a space-time modulator, 15 to a spreader for probe signal, 16 to a unit for calculation of correlation matrix, 17 to a spreader for probe signal, 18 to a power control unit, 23 to a signal input line, 24 to a multiplexer, 25 to a conjugate calculator, 26 to a delay device, 27 to a multiplier, and 28 to a memory.

Generally, in order to expand coverage of a cell as a communication area in mobile communication, an antenna is installed on a high steel tower or a rooftop of a building, being separated from a main part (an RF unit, a baseband unit, a control unit, etc.) of a base station. Accordingly, it is necessary to draw cables several ten meters long, and thus, it is difficult to keep phase relation between signals of respective antenna systems in their transmission. Further, the RF unit constituting the base station amplifies signals by amplifiers, and it is difficult to amplify signals while uniformly maintaining the noise figure (NF) and amplitude of respective systems. Thus, it is necessary to provide the base station with a unit that compensates the level and phase in some way.

With respect to a receiving system of the base station apparatus, it is not necessary to compensate the level and phase as mentioned above, as long as an adaptive array antenna is employed. This is because, in the process of realizing the optimum array weight control, phase deviation and level deviation are compensated automatically. On the other hand, in a transmission system, control of array weight is performed based on the array weight estimated in the receiving system as uplink, and accordingly, the system requires a mechanism for compensating the level and phase deviations generated in the receiving system and the level and phase deviations generated in the transmission system. The control of array weight is performed individually for each user, and thus, in the case of a CDMA system, array control in a baseband is desirable. Thus, it is necessary to maintain amplitude relation and phase relation of signals generated from baseband signals when they are transmitted from an antenna.

As technical literature relating to control of an adaptive array antenna, may be mentioned an article, "1999 General Convention of the Institute of Electronics, Information and Communication Engineers, B-4-41", which is incorporated herein by reference.

A radio base station apparatus as an object of the embodiments of the present invention employs the CDMA system as a radio communication system, and uses an array antenna so that it can reduce interference between channels and increase channel capacity. The radio base station apparatus is constructed to include a receive calibration system (Rx calibration system) and a transmit calibration system (Tx calibration system). One of these systems may be used in certain embodiments, which are included in the scope of the present invention. However, to realize the Tx calibration system, both the Rx calibration system and Tx calibration system are required.

As shown in FIG. 1, a radio base station apparatus according to one embodiment of the present invention comprises: an antenna apparatus 1 consisting of a plurality of antenna elements 1; couplers 2 respectively provided in the neighborhoods of terminals of the antenna elements on the side of the base station apparatus; an RF unit 3 that converts a received signal to a baseband signal, converts a transmission signal to a radio frequency, and performs power control; an A/D converter 4 that converts the received baseband signal to a digital signal; an Rx beam form unit 6 that multiplies the digitized received signal by pre-set weight; a despreader 7 that despreads this signal; a time-space demodulator 8 that demodulates the despread signal to obtain user data; a despreader 9 for probe signal, that despreads the output signal of the A/D converter 4; a time-space modulator 14 that modulates user data; a spreader 13 that spreads this user data; a channel combiner 12 that performs channel combining with respect to signals from the spreader 13; a Tx calibrater 11 that controls signal calibration according to the present invention; a D/A converter 10 that converts a digital signal from the calibrater 11 to an analog signal to send it to the RF unit 3; a unit 16 for calculation of correlation matrix, that produces a probe signal for controlling the Rx calibration system and the Tx calibration system, and calculates calibration required for phase and amplitude calibration of a received signal; a spreader 17 that spreads the probe signal; a power control unit 18 that controls power of the probe signal; a D/A converter 19 that converts the probe signal to a digital signal; an RF unit 20 that has the equivalent function as the RF unit 3, inputs the probe signal to the couplers 2, and converts signals from the couplers 2 to digital signals; a despreader 22 that despreads those signals, and a spreader 15. The spreader 15 is a circuit which spread-modulates a reference signal generated by the correlation calculation unit 16 with a particular spread code. The reference signal may be, for example, a signal comprising all zeros.

Next, there will be described the Rx calibration system in the base station apparatus constructed as described above. In FIG. 1, a signal line shown as a heavy line indicates that, in fact, there exist signal lines corresponds to the number of the antenna elements in the antenna apparatus 1. Further, with respect to a component having input and output connected to a signal line of a heavy line, it means, in fact, that there exist a plurality of such components corresponding to the number of the antenna elements in the antenna apparatus 1.

In the Rx signal calibration system, it is necessary to add the probe signal at terminals of the antennas. In order to minimize effect on communication, the added probe signal should be controlled in its power. Phase relation of each pair of the antennas can be obtained by calculating the correlation with respect to the result of despreading the probe signal. When the correlation shows a specific relation, it is assured that the received signals also have a specific relation, and each deviation of level and phase can be measured.

Accordingly, in the embodiment, the base station apparatus possessing the array antenna having a plurality of antenna elements comprises: the unit that adds the probe signal to each of received signals received by the antenna elements of the mentioned array antenna; the probe signal despreading unit that despreads the mentioned probe signal added to the received signals; the calibration calculating unit that calculates calibration required for calibrating phase and amplitude of each received signal based on the signals from the mentioned despreading unit; and a unit for calibrating phase and amplitude of the mentioned each received signal based on the calibration from the mentioned calibration calculating unit.

In FIG. 1, signals received by the antenna apparatus 1 are mixed by the couplers 2 with the probe signal separately generated within the base station. In number, the couplers corresponds to the antenna elements, and the probe signal to be mixed is branched and applied to each antenna element.

The probe signal is supplied to the couplers 2 through one supply line. Complex amplitude of the probe signal supplied to each antenna element is decided by the physical relation between the couplers 2 and the signal supply line. By previously obtaining this relation in a known environment such as a laboratory, the level and phase relation of the probe signal to be supplied can be known. In an actual field, based on those known data, it is possible to detect the level and phase deviations of the signal, which are generated since the signal passes through the RF unit 20 and the cable between the couplers 2 and the RF unit 20.

The data that becomes source of the probe signal is a specific signal such as an all-0 signal, and produced by the unit for calculation of correlation matrix 16. The produced data is spread by the spreader 17 for probe signal. The power of the probe signal must be sufficiently small in comparison with other communication signals. This is because, when the power of the probe signal is large, interference by the probe signal largely affects other communication, and reduces the channel capacity. By this reason, the power control unit 18 keeps the power of the probe signal at the necessity minimum. The signal subjected to the power control is converted to an analog signal by the D/A converter 19. The converted probe signal is subject to frequency conversion and power conditioning, inputted to the couplers 2 through the supply line, and added to the received signals from the antenna apparatus 1.

In the meantime, in the CDMA system, peak detection is required for detecting a phase of the spread code of the received signal. Methods of realizing it includes a method in which a signal received by an omni-antenna is used for the peak detection, and a method in which a signal received by one antenna of array antenna is used for the peak detection. However, in these methods, it may happen that the peak detection does not work well since the array gain can not be obtained owing to large interference power when, for example, the number of connected channels increases. In order to solve this problem, effective is a method of improving a signal-to-interference-power ratio by employing beam forming with fixed weight to convert signals received through respective antenna elements (element space) to a group of independent beams (beam space).

For this fixed beam forming, it is desirable that beam shapes are variable in accordance with time selectivity or space selectivity of, for example, traffic or topography, so as to improve peak detection sensitivity. To this end, it is convenient that the beam form unit for conversion to the beam space operates in the baseband. In this semi-fixed beam forming, an array response vector adapted for a specific signal is not obtained, but a given directivity response pattern is realized by the beam form unit. Thus, it is impossible to produce a desired directivity response pattern when level or phase deviation is generated in the cable or the RF unit similarly to the transmission system. Thus, a mechanism for compensating the level and phase deviations is required.

Now, the received signals, which are received through a plurality of antenna elements of the antenna apparatus 1 and added with the probe signal, are subjected to frequency conversion in the RF unit 3, converted to baseband signals for respective antenna elements, and further converted to digital signals by the A/D converter 4. The signals converted to the digital signals by the A/D converter 4 are multiplied with semi-fixed array weight (array response vector) in the beam form unit 6 to be replaced by the beam space having a main beam in a specific direction of the antenna apparatus 1. At that time, if bit width of the array weight is sufficient, not only beam forming is performed, but also the level and phase deviations generated in the cable and the RF unit can be calibrated at the same time. This relation can be expressed by Eq. 1.

$$x = W^H Cr$$
$$= \begin{bmatrix} w_{11} & \Lambda & w_{11} \\ M & O & M \\ w_{11} & \Lambda & w_{11} \end{bmatrix}^H \begin{bmatrix} c_1 & & 0 \\ & O & \\ 0 & & c_n \end{bmatrix} \begin{bmatrix} r_1 \\ M \\ r_n \end{bmatrix}$$
$$= Qr$$

Eq. 1

In Eq. 1, x is a signal vector in the beam space, r is a signal vector in the element space, and C indicates calibration operation in the element space. Further, W indicates the conversion operation from the element space to the beam space. In the third line of the equation, the matrices W and C are expressed unitedly by their product Q. This operation expresses the calibration and array weight operation according to the present invention. The beam form unit 6 in FIG. 6 multiplies the received signals by the matrix Q in response to a control signal from the blow-mentioned unit for calculation of correlation matrix 16, so as to perform unified operation including the beam forming and calibration of each element. As a result, the signals can be obtained from the beam form unit such that a signal from a specific direction (within the formed beam) is outputted as a larger value. In the present invention, the above-mentioned received signal calibration unit and the beam form unit for the array antenna are put together into one unit in the above-mentioned radio base station apparatus.

With respect to the signals converted to the beam space, the despreader 7 performs peak detection, and performs despreading operation based on the obtained path phase. As already described, the desired wave signals that come to have the space selectivity by the conversion to the beam space are improved in the signal-to-interference-power ratio, and become easy to perform the peak detection. The signals subjected to the despreading by the despreader 7 are returned to a user signal by the space-time demodulator 8 as a decoding unit. The user signal demodulated by the decoding by the space-time demodulator 8 is one that is obtained by combining the signals spread in the space and time directions with suitable weight to obtain diversity effect.

Calibration information used in the above-mentioned beam form unit 6 can be obtained by the procedure described in the following.

The signals that have been converted to the digital signals by the A/D converter 4 still have the level and phase deviations generated in each antenna element. The despreader 9 extracts these level and phase deviations and performs despreading operation on the probe signal included in the signals. The signals extracted from the despreader 9 by this operation are the probe signals applied to the terminals of respective antenna elements, added with the level and phase deviations generated in the RF unit 3 and the cables connecting the couplers 2 and the RF unit 3. The output signals of the probe signal despreader 9 are applied to the unit 16 for calculation of correlation matrix, to be used for preparing a correlation matrix for extracting level and phase relations.

The unit 16 for calculation of correlation matrix obtains the correlation matrix based on the signals from the probe signal despreader 9. The obtained correlation matrix is the sum of a signal subspace and an interference subspace. The interference subspace becomes an error factor when other communications have space selectivity, and it is desirable to delete the interference subspace. The interference subspace can be obtained by performing spread intentionally using a spreading code that has not been used and by obtaining a similar correlation matrix based on the result of spreading. As shown in Eq. 2, the mentioned interference subspace can be obtained as a signal subspace A by subtracting the correlation matrix I that is obtained by performing despread intentionally using the nonuse spreading code, from a correlation matrix S that is obtained by using a spreading code adapted for the probe signal.

$$A = S - I = \begin{bmatrix} S_{11} & \Lambda & S_{1n} \\ M & O & M \\ S_{n1} & \Lambda & S_{nn} \end{bmatrix} - \begin{bmatrix} i_{11} & \Lambda & i_{1n} \\ M & O & M \\ i_{n1} & \Lambda & i_{nn} \end{bmatrix}$$

Eq. 2

Element space signature is obtained as the information obtained by calculating an eigen vector having the maximum eigen value from the obtained signal subspace A. This information indicates in which level and phase relation the signal applied in the element space is received. The obtained information should be a value (target) predetermined by the topology of the antenna and the coupling relation of the system to which the probe signal is applied. The discrepancy between the measured value and the target becomes the calibration. As the correlation matrix (target) that should be obtained in advance, can be used measurement obtained when the array pattern is adjusted to desired characteristics in a special measurement environment such as an anechoic chamber. By using this measurement as the target to obtain the calibration matrix C, it is possible to reproduce the desired array pattern even in an actual environment.

Next, a method of obtaining the calibration will be described. Eq. 3 is a matrix indicating the probe signal subspace A measured in advance in a laboratory etc. when the level deviation and the phase deviation owing to the cable and the RF unit do not exit or are calibrated. The eigen vector a with the maximum eigen value can be obtained from the matrix A. Eq. 4 shows that a is an eigen vector of the matrix A.

$$A = \begin{bmatrix} a_{11} & \Lambda & a_{1n} \\ M & O & M \\ a_{n1} & \Lambda & a_{nn} \end{bmatrix}$$

Eq. 3

$$f \stackrel{\ast}{=} eig(A) = \begin{bmatrix} \alpha_1 \\ M \\ \alpha_n \end{bmatrix}$$

Eq. 4

Figure 4:
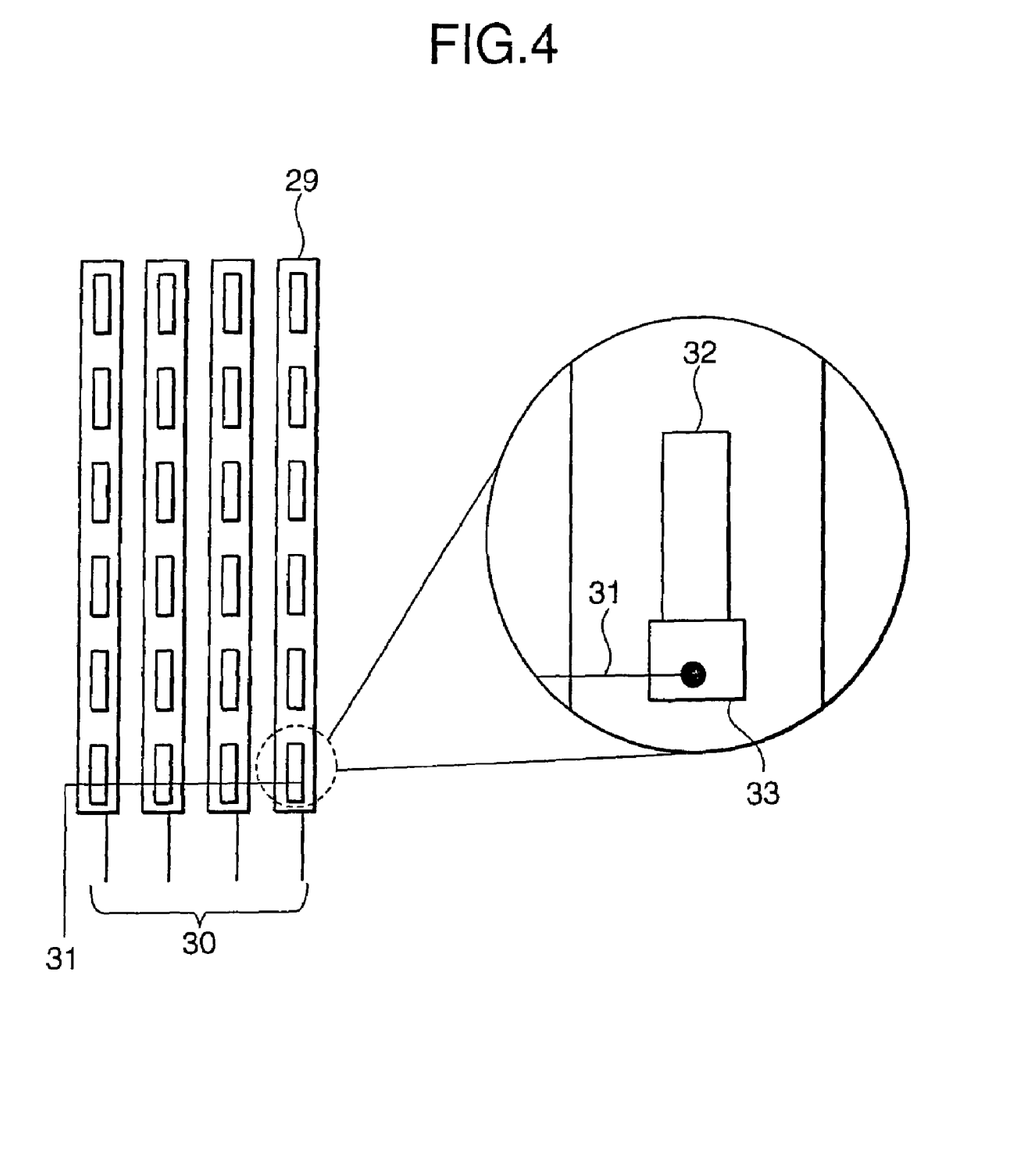
FIG. 4 is a view for explaining an example of configuration of an antenna apparatus according to the present invention.

The operation eig in FIG. 4 means a function for extracting the eigen vector having the maximum eigen value. On the other hand, a signal subspace B measured in the actual environment is shown in Eq. 5. Also with respect to the matrix B, the eigen vector having the maximum eigen value can be obtained by the similar calculation. Eq. 6 shows the eigen vector β of the matrix B. And, the calibration matrix of the element space can be obtained by Eq. 7.

$$B = \begin{bmatrix} b_{11} & \Lambda & b_{1n} \\ M & O & M \\ b_{n1} & \Lambda & b_{nn} \end{bmatrix} \qquad \text{Eq. 5}$$

$$f\text{Aeig}(B) = \begin{bmatrix} \beta_1 \\ M \\ \beta_n \end{bmatrix} \qquad \text{Eq. 6}$$

$$C = \begin{bmatrix} c_1 & & 0 \\ & O & \\ 0 & & c_n \end{bmatrix} = \begin{bmatrix} \beta_1/\alpha_1 & & 0 \\ & O & \\ 0 & & \beta_n/\alpha_n \end{bmatrix} \qquad \text{Eq. 7}$$

When the calibration matrix C is obtained, the array control method shown in FIG. 1 can perform the conversion from the element space to the beam space and the calibration of the level and phase deviations in the element space, at the same time.

As an important point here, the probe signal applied at the terminals of the antenna does not pass through the propagation path and accordingly is not affected by fading and the information of the probe signal is known. Owing to this, the despreading operation can be performed easily. As another important point, the generation and reception of the probe signal is performed in the same or adjacent apparatuses. Owing to this, it is possible to commonly use a local oscillator used for frequency conversion and timing generation in the RF unit.

Since the present embodiment of the invention has the above-described configuration, it is possible to easily realize in-phase addition in a very long time without generating a frequency error and timing error. Further, variations of the phase and amplitude generated in the cable and the RF unit are very slow in comparison with the chip rate of the received signals, and it does not practically become problem to spend a long measuring time for estimating the correlation matrix. Accordingly, by increasing the spreading rate, effect of the probe signal on the other communications can be made very small. Signal strength of the probe signal can be known by the diagonal elements of the signal subspace. By controlling the power control unit 18 such that the diagonal elements give sufficient signal strength although not larger than the necessary, the effect of the probe signal on the other communications can be made very small. Further, in the above-described embodiment of the present invention, the level and phase deviations of each system are calibrated in the baseband unit. This can decrease calibration operation and production costs.

In the above-described embodiment of the present invention, is described the configuration in which signals from a plurality of antenna elements are despread at the same time for obtaining the signal subspace. However, calibration cycle of the calibration matrix is sufficiently slow in comparison with the spreading rate, the calibration matrix can be updated by time sharing processing.

FIG. 2 shows circuit structure of the unit 16 for calculation of correlation matrix for the case that the calibration matrix is generated by the time sharing processing. In the following, this will be described. The unit 16 for calculation of correlation matrix of this example comprises a multiplexer 24, a conjugate calculator 25, a plurality of delay devices 26, a plurality of multipliers 27, and a plurality of memories 28.

In FIG. 2, signals inputted to signal input lines 23 are signals from the respective antenna elements, signals from the despreader 9 for probe signal, shown in FIG. 1, the probe signals applied to the terminals of the respective antenna elements, and the level and phase deviations applied in the RF unit and in the cables between the couplers 2 and the RF unit 3. In the shown case, the multiplexer 24 has a function of timesharing six input signals one by one.

The signals outputted serially in time sharing from the multiplexer 24 are inputted into the conjugate calculator 25 and into the multipliers 27 that are connected to the output sides of the conjugate calculator 25 and the serially-connected delay devices 26. The delay devices 26 operate synchronously with the multiplexer 24, and accordingly the multipliers 27 performs calculation of correlation between the signals delayed by the delay devices 26 and the just-inputted signal.

The results of this operation are accumulated in the memories 28. As a result, at a point of time when time-division multiplexing corresponding to six devices is finished in the multiplexer 24, the correlation matrix is accumulated in the memories 28. This information accumulated in the memories 28 is delivered to the beam form unit 6 of FIG. 1, to be subjected to the weight calibration processing in the baseband according to the present invention. Further, if necessary, contents accumulated in the memories 28 can be used after further averaging processing. In that case, precision of the calibration can be improved.

Next, the transmission system in the base station apparatus constructed as shown in FIG. 1 will be described. The Tx calibration system should add the probe signal to transmission signals in the baseband unit, and extract the signals from the terminals of the antennas. It is necessary to perform investigation on one antenna system (element) out of a plurality of antenna terminals. This investigation can be performed such that: (1) one of signals to a plurality of antenna systems is selected in the baseband, and the probe signal is applied to that signal; (2) signals extracted from the antenna terminals are subjected to despreading, to investigate response of each antenna system by time sharing; and (3) correlation is calculated on the result of despreading. When the correlation indicates a specific relation, it is assured that received signals are also in the specific relation, and each of the level and phase deviations can be measured.

According to the present embodiment, in the above-mentioned configuration, the RF unit that converts the mentioned received signals to baseband signals has a function of converting the signals, which have been subjected to the D/A conversion, to radio frequencies so as to input them into the respective antenna elements; the mentioned couplers have a function of extracting a part of transmission signal inputted into each of antenna elements; and the mentioned probe signal RF unit has a function of converting the signals from the mentioned couplers to baseband signals. Further, the present embodiment comprises: the spreader for Tx probe signal, which spreads a specific code series using a specific spread code; the Tx signal calibrater that calibrates transmission signals generated in the modulator by the signals from the mentioned unit for calculation of correlation matrix; the Tx signal combiner that adds the output signal of the mentioned spreader for Tx probe signal to only a signal to be transmitted from one antenna element out of the signals generated by the mentioned calibrater, so as to generate a transmission signal added with probe; the D/A converter that converts the output of the mentioned Tx signal combiner from a digital signal to an analog signal and inputs the converted signal to the mentioned RF unit that converts received signals to baseband signals; the A/D converter for probe signal that performs conversion from an analog signal to a digital signal on the signals that are received from the mentioned couplers and have been converted to the baseband signals in the mentioned probe signal RF unit; and the despreader for Tx probe signal that despreads the output of the mentioned A/D converter for probe signal using the spread code of the Tx probe signal so as to input the result to the mentioned unit for calculation of correlation matrix. The mentioned unit for calculation of correlation matrix is provided with the Tx signal calibration system that obtains correlation of Tx probe signals between each pair of the antennas based on the output of the despreader for Tx probe signal and calculates quantity of phase rotation and quantity of amplitude calibration required for realizing a specific relation between the eigen vector having the maximum eigen value decided from the obtained correlation matrix and a predetermined vector, so as to control the calibration by the mentioned calibrater.

In FIG. 1, prepared user data is subjected to space modulation by the space modulator 14. The space modulator means a modulation circuit that additionally contains operations for giving a suitable phase and amplitude to each antenna element in order to form a beam, in comparison with an ordinary modulation circuit. Information of a user is spread by the spreader 13 using a spread code that is different for each user. The spread data is added in the channel combiner 12 to be aggregated to information corresponding to the number of the antenna elements. The signal aggregated to the number of the antenna elements is subject to pre-calibration in the calibrater 11 based on the signal from the unit 16 for calculation of correlation matrix, with respect to the level deviation and phase rotation that are to be generated in the cables, amplifiers, etc. The calibrated signal is converted to an analog signal in the D/A converter 10, subjected to up-conversion and power amplification in the RF unit 3, and inputted to each antenna element, to be transmitted from the antenna apparatus 2.

The method of obtaining the calibration vector for transmission signals in the unit 16 for calculation of correlation matrix is generally similar to the above-described case of the receiving system.

Namely, a reference signal (for example, a signal of all-0) generated in the correlation calculation unit 16 is spread with a specific spread code by the spreader 15. The spread signal is added to a signal line corresponding to each antenna element, between the calibrater 11 and the D/A converter 10. In this operation, the signal is not distributed to all the antenna elements at the same time but added to each signal line one after another by time-sharing. By this, a receiving side can clearly distinguish an antenna element that transmitted the received signal.

Here, the Tx probe signal is mixed to a specific antenna by time-sharing. However, the Tx probe signal may be added at the same time, by changing the spread code for the Tx probe signal for each antenna element. Namely, it is simply that signals applied to the respective antenna elements are spread by respective spread codes. In this case, however, interference given by the measurement system increases, being multiplied by the number of the antenna elements.

At the terminal of each antenna element, is provided the coupler 2, and the coupler 2 extracts a part of the signal transmitted. The extracted signal is down-converted by the RF unit 20. Thereafter, the signal from the RF unit 20 is converted to a digital signal by the A/D converter 21, and the converted signal is despread by the despreader 22 to be inputted to the unit 16 for calculation of correlation matrix. The unit 16 for calculation of correlation matrix calculates the calibration matrix C by the method shown by the above-described Eqs. 1-7. The calculated calibration matrix C is inputted to the calibrater 11 for calibration of the transmission signal.

The above-described embodiment of the present invention can also calibrate the amplitude and phase deviations owing to the cables, amplifiers, etc. in the transmission system.

Further, in order to decrease the effect of the probe signal, it is necessary to increase the spreading rate. When the same local oscillator is used both the generating and receiving units for the probe signal, it is possible to decrease synchronization errors and to decrease circuits required for synchronization. Since the generating unit and the receiving unit for the probe signal exist very closely to each other, it is not difficult to commonly use the local oscillator. Thus, in the present embodiment, in the above-described radio base station apparatus, the mentioned Rx signal calibration system and Tx signal calibration system use the same local oscillator as an oscillation source to perform up-conversion and down-conversion, and to perform timing generation.

The radio base station apparatus according to thus-described embodiment of the present invention has been described as one in which the RF units 3 and 20 of FIG. 1 use the same local oscillator. However, according to the present invention, these RF units 3 and 20 may use different local oscillators, and, in that case, the AFC (Auto Frequency Control) function may be used to obtain spread gain.

Figure 3:
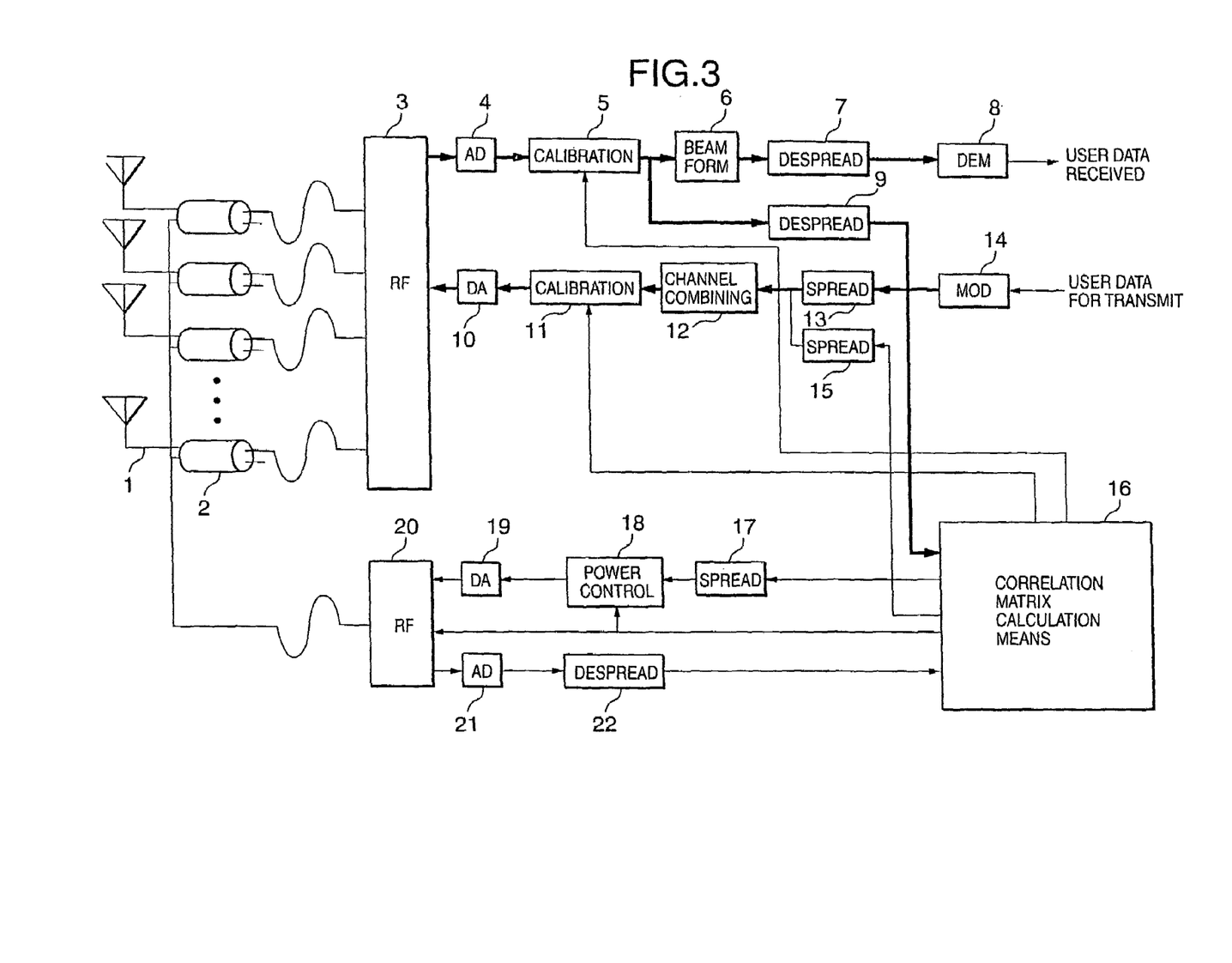
FIG. 3 is a diagram showing a configuration of another radio base station apparatus according to the present invention.

FIG. 3 is a block diagram showing a configuration of a radio base station apparatus according to another embodiment of the present invention, and it will be described in the following. In FIG. 3, the reference numeral 5 refers to a calibrater and the other symbols are same as in FIG. 1.

The embodiment shown in FIG. 3 is different from the embodiment shown in FIG. 1 in that the beam form unit 6 for the Rx calibration system is separated into a beam form unit 6 and the calibrater 5, that the point for extracting the probe signal is an output terminal of the calibrater 5, and that the signal obtained by spreading the reference signal of the Tx calibration system is inputted to an output terminal of the spreader 13. In such structure, the results of a series of operations on the signals are not changed, and the results similar to FIG. 1 are obtained.

In the above-described embodiment, the probe signal is spread by the spreaders 15 and 17. However, since the other signals are spread, it is not necessary to spread the probe signal in order to separate it from the other communications. In other words, it is because the probe signal can be considered as a signal spread by a signal of all-0. Thus, the above-described embodiment of the present invention can dispense with the spreaders 15 and 17, which simplifies the apparatus. When a carrier leak of the base station apparatus is sufficiently small and interference from the other communication systems is small, then, a sine wave may be used as the probe signal.

However, when there is a carrier leak in the radio base station apparatus or when there are other communication systems and many undesired signals exist in the carrier frequency, then, omission of the spreaders 15 and 17 may lower the performance.

Figure 5:
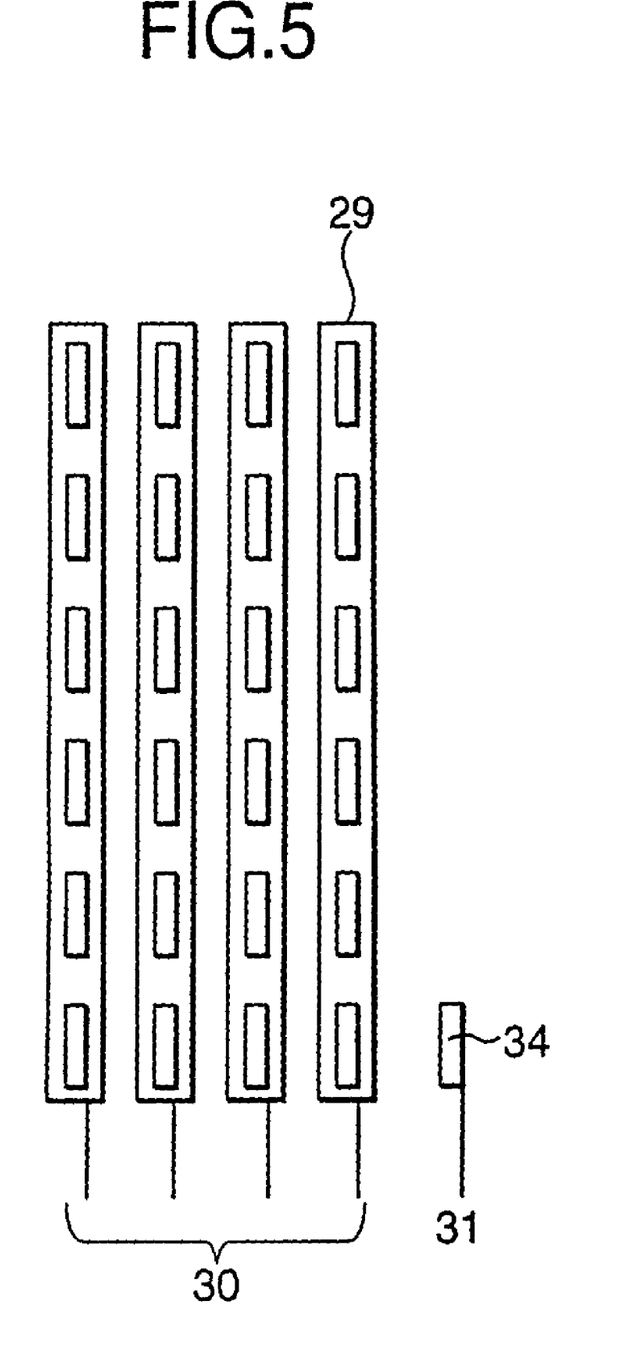
FIG. 5 is a view for explaining an example of configuration of another antenna apparatus according to the present invention.
Figure 6:
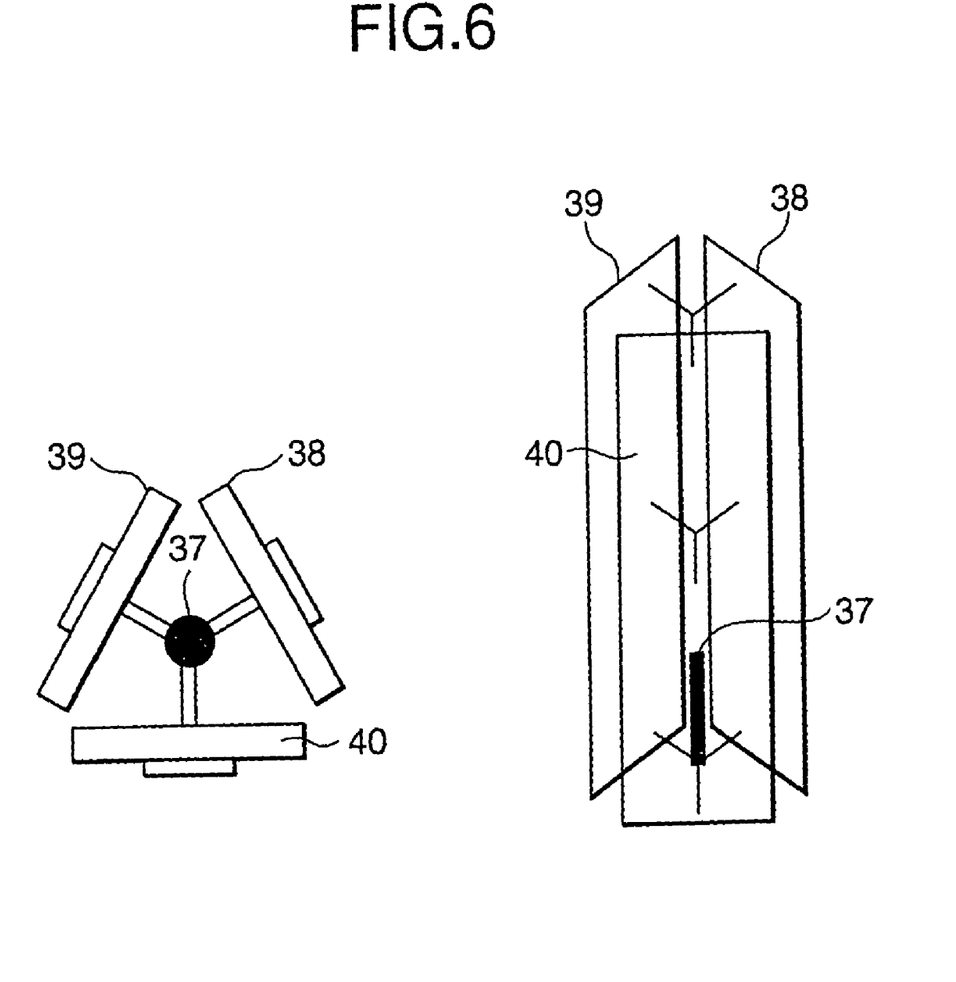
FIG. 6 is a view for explaining an example of configuration of still another antenna apparatus according to the present invention.

FIGS. 4-6 are views for explaining examples of configuration of an antenna apparatus according to embodiments of the present invention, and, now, structure of the antenna will be described in the following. In FIGS. 4-6, the reference numeral 29 refers to an antenna element, 30 to a signal line, 31 to a probe signal line, 32 to a radiating element, 33, 34 and 37 to probe signal elements, and 38-40 to array antennas.

The above-described embodiments of the present invention have been described as ones in which the couplers are provided in the subsequent stage of the antenna terminals. However, when the target is to be obtained in a test in an anechoic chamber or the like, it is convenient that a coupler is contained in an antenna itself. The antenna apparatus of the embodiment shown in FIG. 4 is an array antenna that comprises a plurality of antenna elements 29. The signal lines 30 connected to the terminals of the antenna elements 29 are connected to the RF unit 3, and the probe signal line 31 is connected to the RF unit 20.

Within a circle, is shown an enlarged view of parts constituting a coupler 2. The coupler 2 comprises a probe signal element 33 consisting of a piece of metal that is in weak conjunction with a radiating element 32 connected to a signal line for each antenna element 29. The signal line 31 is connected to this probe signal element 33. It is sufficient that the terminal of the antenna element 29 to which the signal line 30 is connected and the terminal of the probe signal element 33 to which the probe signal line 31 is connected are in weak conjunction with each other at isolation of about 20 dB.

The antenna apparatus shown in FIG. 4 according to the embodiment of the present invention can be constructed such that the antenna apparatus 1 and the couplers 2 are unified. Thus, the convenient antenna apparatus can be constructed.

FIG. 5 shows structure of an antenna apparatus according to another embodiment of the present invention. This antenna apparatus is an array antenna similar to one shown in FIG. 4. In this antenna apparatus, a part constituting a coupler 2 is constructed such that a probe signal element 34 as an antenna element for radiation of the probe signal is provided in the neighborhood of a plurality of antenna elements 29 in common. Even when the coupling element is arranged in space as described, can be obtained an effect similar to the case described referring to FIG. 4 in which input and output of signal is carried out through the weak conjunction with the radiating element of the antenna.

FIG. 6 shows a configuration of an antenna apparatus according to still another embodiment of the present invention.

This antenna apparatus is an example of an antenna apparatus constructed such that a plurality of array antennas described referring to FIG. 5 and a radiating element for probe.

The antenna apparatus shown in FIG. 6 is constructed such that the array antennas 38-40 are arranged in an equilateral triangle to form a triangular prism and a probe signal element 37 is provided in the central portion of the triangular prism. In the example shown in FIG. 6, each array antenna corresponding to a side of the triangle comprises a bottom board (reflecting element) 38'-40' and a radiating element 38"-40" arranged on the surface of the bottom board. In this embodiment, the probe signal element 37 is arranged in the center of the cavity enclosed by the array antennas 38-40. Thus, although the distance between the array antennas and the probe signal element is short, their conjunction becomes weak owing to the existence of the reflecting plates. Further, whole surface of each array antenna is covered with a reflecting plate, and accordingly, interference power that signal power radiated by the probe antenna gives to another communication can be made small.

The antenna apparatus described referring to FIG. 6 is constructed such that the array antennas are arranged into a triangular prism. However, according to the present invention, a plurality of array antennas or antenna elements may be arranged in a shape of a polygon, or antenna elements may be arranged into a cylinder. In that case, when the probe signal element exists inside the polygon or cylinder made by the array antennas, similar effect can be obtained.

As described above, according to the present invention, it is possible to provide a radio base station apparatus in which amplitude and phase deviations of signals generated to an array antenna owing to cables connected to the base station apparatus and amplifiers within the base station apparatus can be calibrated in the baseband. In addition, an antenna apparatus that is suitable for use in combination with this base station can be provided. When these apparatuses are applied to a communication system according to the CDMA system, interference power given to other communications can be suppressed to be small.

The invention claimed is:

1. A radio base station apparatus provided with an array antenna having a plurality of antenna elements for calibrating a phase difference among the array antenna elements, comprising:
    a probe signal adding unit which divides one probe signal into a plurality of divided probe signals and adds the divided probe signals to each of a plurality of receive signals received by said plurality of antenna elements;
    a probe data extracting unit which extracts the probe data from said receive signals added with the probe signal;
    a phase calibration calculation unit which calculates correlation phase calibration values, and levels of said receive signals, required for calibrating a phase of each receive signal based on the probe data extracted by said probe signal extracting unit; and
    a phase calibration unit for calibrating a phase difference among the array antenna elements by calibrating said phase of said plurality of receive signals based on the correlation phase calibration values from said phase calibration calculation unit.

2. The radio base station apparatus according to claim 1, wherein said probe signal extracting unit comprises a dispreading unit which dispreads the receive signals added with said probe signal to extract said probe signal.

3. The radio base station apparatus according to claim 2, wherein
    said probe signal adding unit comprises:
    a probe signal generating unit which spreads probe data with a predetermined pattern signal to generate the probe signal;
    a conversion unit which converts said probe signal to a radio signal;
    a coupling unit which couples said probe signal, converted to said radio signal, and said receive signals; and
    a correlation unit that correlates said predetermined signal pattern on signals outputted from said coupling unit, using the same spread code used in said probe signal generating unit, in order to extract the probe data, wherein said phase calibration calculation unit calculates the phase calibration required for calibrating the phase of each receive signal based on the probe data extracted by said correlation unit.

4. The radio base station apparatus according to claim 3, wherein said phase calibration calculation unit:
    compares the probe data extracted by said correlation unit and the original probe data inputted to said probe signal generating unit;
    calculates a quantity of distortion given to the probe data extracted by said correlation unit;
    calculates the calibration that cancels said quantity of distortion; and
    wherein said phase calibration unit calibrates said plurality of receive signals based on said calibration.

5. The radio base station apparatus according to claim 3, further comprising:
a power control unit that controls the power of the probe signal generated by said probe signal generating unit and outputs the probe signal that has been subjected to the power control to said conversion unit.

6. The radio base station apparatus according to claim 5, wherein a power of said probe signal is smaller than the power of other communication signals.

7. The radio base station apparatus according to claim 1, further comprising:

an amplitude calibration calculation unit which calculates amplitude calibration required for calibrating amplitude of each of said plurality of receive signals based on the probe signal extracted by said probe signal extraction unit; and an amplitude calibration unit which calibrates an amplitude of said each receive signal based on the amplitude calibration from said amplitude calibration calculation unit.

* * * * *